United States Patent [19]

Molnar

[11] Patent Number: 5,282,130
[45] Date of Patent: Jan. 25, 1994

[54] METHOD AND APPARATUS FOR OBTAINING PROCESS CHARACTERISTICS IN A SELF-TUNING CONTROLLER

[75] Inventor: Richard J. Molnar, Willoughby, Ohio

[73] Assignee: Elsag International B.V., Amsterdam Zuidoost, Netherlands

[21] Appl. No.: 886,686

[22] Filed: May 20, 1992

[51] Int. Cl.$^5$ .............................................. G05B 13/02
[52] U.S. Cl. ...................................... 364/157; 364/158
[58] Field of Search ................................. 364/148–177

[56] References Cited

U.S. PATENT DOCUMENTS

| | | | |
|---|---|---|---|
| 3,786,242 | 1/1974 | Brooks | 364/159 |
| 4,006,346 | 2/1977 | Pemberton | 364/159 |
| 4,441,151 | 4/1984 | Hayashibe | 364/159 |
| 4,602,326 | 7/1986 | Kraus | 364/158 |
| 4,881,160 | 11/1989 | Sakai et al. | 364/161 |
| 5,132,916 | 7/1992 | Gulaian et al. | 364/502 |
| 5,170,341 | 12/1992 | Sklaroff | 364/162 |

OTHER PUBLICATIONS

Ziegler, J. G. and Nichols, N. B., "Optimum Settings for Automatic Controllers." Transaction ASME, 64 (1942), 759–765; rpt. pp. 3–12.

Miller, J. A., Lopez, A. M., Smith, C. L. and Murrill, P. W., "A Comparison of Controller Tuning Techniques." Louisiana State University, Control Engineering, (Dec. 1967), 72–75; rpt. pp. 16–19.

*Primary Examiner*—Jerry Smith
*Assistant Examiner*—Jim Trammell
*Attorney, Agent, or Firm*—Michael M. Rickin

[57] ABSTRACT

The characteristics of the field process system controlled by a self tuning controller are obtained by analyzing the open loop response of the process variable to a step applied at the controller's control output. A first-order system response with pure time delay is used to approximate a higher-order field process system's actual response. The overall deadtime and time constant of the first-order approximation are determined. The maximum slope of the process variable response to the step is stored along with an assigned time of its occurrence and an assigned process variable. The stored information is used to approximate the overall deadtime. In one embodiment the stored information is assumed to be the data obtained from a second-order response having a 10:1 time constant ratio and is used to find the assumed second-order time constants which are used to find the first-order time constant. In a second embodiment the first order time constant is determined by using a convergence point falling within a predetermined range between the actual response data and the first-order approximation. The step is not applied to the control output until the process variable has reached the initial steady state condition and the calculation of slope ceases when the process variable response reaches the final steady state condition. Alternative techniques are disclosed for determining the steady state condition.

9 Claims, 9 Drawing Sheets

METHOD AND APPARATUS FOR OBTAINING PROCESS CHARACTERISTICS IN A SELF-TUNING CONTROLLER

BACKGROUND OF THE INVENTION

1. Field of the Invention

This invention relates to controllers of the type known as self-tuning or automatic-tuning and more particularly to a method and apparatus for use in such controllers to obtain the process characteristics.

2. Description of the Prior Art

Industrial processes are typically overdamped and of higher-order having two or more poles. In addition, a typical industrial process has one pole that is more dominant than the other poles. It is for this reason that various methods have been used for many years to approximate a higher-order industrial process by a first-order (single pole) system with pure time delay.

Often an open loop step response is used to obtain the characteristics of the process. An open loop step refers to the process controller (independent of the process reaction) outputting a sudden change in constant signal level to the process. A step input to the process is equivalent to applying the entire spectrum of frequencies to the process; hence, the process response to the step depends on its dynamic characteristics. An open loop step response is a good way to analyze the process.

It has been known for many years that the overall deadtime and time constant of an industrial process are closely related to the optimum proportional, integral and derivative ("PID") values of the controller which is to control it. This relationship is described in "Optimum Settings for Automatic Controllers", J. G. Ziegler and N. B. Nichols, Transaction ASME, 64, pp. 759-765 (1942). Ziegler and Nichols refer to deadtime rather than overall deadtime and it is not clear to me if their deadtime is the same as overall deadtime; in the sense that overall deadtime is the sum of the "apparent delay" and the "transport delay". The apparent delay and the transport delay will be defined hereinafter in connection with the description of FIG. 7. The discussion which follows herein assumes that the Ziegler-Nichols deadtime is the same as the overall deadtime.

Ziegler and Nichols suggest that a tangent line should be drawn where the slope is maximum on the open loop step response curve (the "Ziegler-Nichols method"). For many years the only way to implement the Ziegler-Nichols method was to plot the response on paper and draw the tangent line on the plot. The point where the tangent line intercepts the time axis is defined as the end of the overall deadtime for the process. Hence, the time from the relative starting point to this slope intercept of the time axis equaled the overall deadtime.

A second method that was considered at the time it was published to be an improvement over the Ziegler-Nichols method, is described in "A Comparison of Controller Tuning Techniques", J. A. Miller, A. M. Lopez, C. L. Smith, and P. W. Murrill (the "Miller, et al. method"), Louisiana State University, Control Engineering, Dec. 1967, pp. 72-75. The Miller, et al. method determines overall deadtime the same way as the Ziegler-Nichols method does. However, the Miller, et al. method defines the time constant as the difference in time between where the step response reached 63.2% of its final value and the overall deadtime. This sounds easy to implement, but it will be shown later that it is not practical to implement in a self-tuning controller.

Miller, et al. state that the difference between the starting level and where the maximum slope intercepted the vertical axis should be considered in the Ziegler-Nichols method to be the ratio of the overall deadtime to the time constant. Therefore, in the Ziegler-Nichols method the time constant equals the overall deadtime divided by the ratio of overall deadtime to time constant. Another way to view it is that in the Ziegler-Nichols method the time constant is inversely proportional to the maximum slope of the response.

The arrival of microprocessor based controllers allowed the process approximation methods to be automated. The automated process approximation methods can be used to arrive at the optimum proportional, integral, and derivative constants for PID controllers. PID controllers are well known in the art and many extensive studies have been done to relate the optimum PID constants to the ratio of overall deadtime and time constant of a first-order system. This is the motivation for accurately matching an industrial process to a first-order system. The results for this optimum PID relationship are very different depending on the criteria the study is based on. Therefore, the present invention is not concerned with which set of criteria is best, but rather, it concentrates on the optimum fitting of a first-order approximation with delay to a real industrial multi-order process open loop step response. The objective is that in order to apply the optimum PID criteria, one must first have the optimum first-order approximation of the process to start with. Controllers of this type that analyze the process and calculate their optimum PID values automatically are commonly referred to as self-tuning or automatic-tuning controllers.

There are other process approximation methods in addition to and more recent than the Ziegler-Nichols and Miller, et al. methods described above. One such method is described in U.S. Pat. No. 4,602,326 (Kraus) wherein a controller outputs a step to the process which increases the magnitude of the process control variable from its steady state value of N to a new level that is 10% above N. In one embodiment the method described in Kraus uses a starting point ($T_f$ of FIG. 9 of Kraus) which occurs 15 seconds prior to the output step. The controller records the time of occurrence at which the process control variable has increased in magnitude by 1%, 2%, 3% and 4% above its steady state value of N. In addition, the controller finds the upper inflection point by a technique referred to in Kraus as the chord method. Slope is measured from the inflection point to each of the one percent increase in magnitude occurrence points. The method chooses the one percent point which has maximum slope and assigns a line from the inflection point to that point. The intersection of that line with the x axis (which is representative of time) is considered to be the overall deadtime of the process. In this respect the method taught by Kraus is identical to the previously described Ziegler-Nichols method.

Another method, described in U.S. Pat. No. 4,881,160 (Sakai, et al.), is said to be an improvement over the chord method described in Kraus. The method described in Sakai, et al. to determine slope uses six points to find five gradients (see FIG. 19 of Sakai, et al.). A correction factor is applied which appears to assume only a first-order response. This is one of the drawbacks of the method described in Sakai, et al. It is well known that industrial process step responses are more representative of second-order or higher-order responses. The correction factor and added points of Sakai, et al. may very well be an improvement over the chord method described in Kraus; however, both the Kraus and Sakai, et al. methods are still inferior when compared to the present invention.

SUMMARY OF THE INVENTION

A method for use in a self tuning controller to obtain the characteristics of a first order approximation having a time constant to a field process system which is controlled by the controller. The field process system has a process variable. The method includes but is not limited to the steps set forth below.

A step input is applied to the field process system. The slope of the response of the process variable to the step input is determined by the following method:

i. first and second sets of moving averages of samples of the response of the process variable are measured. The second set is delay from the first set. The first set has a first predetermined number of samples and the second set has a second predetermined number of samples.

ii. the difference between the first and second sets of moving averages is calculated; and iii. the difference is divided by a predetermined divisor to find the slope.

The maximum slope is determined and a predetermined point associated with the maximum slope is defined in the range of points defined by the first and second predetermined number of samples. The time of occurrence of the maximum slope and the process variable amplitude associated therewith are measured at the predetermined point. The overall deadtime of the field process system is approximated from the maximum slope and the time of occurrence and the process variable amplitude measured at the predetermined point. The first order time constant is then determined from the process variable response to the step input.

DESCRIPTION OF THE PREFERRED EMBODIMENTS

Figure 1:
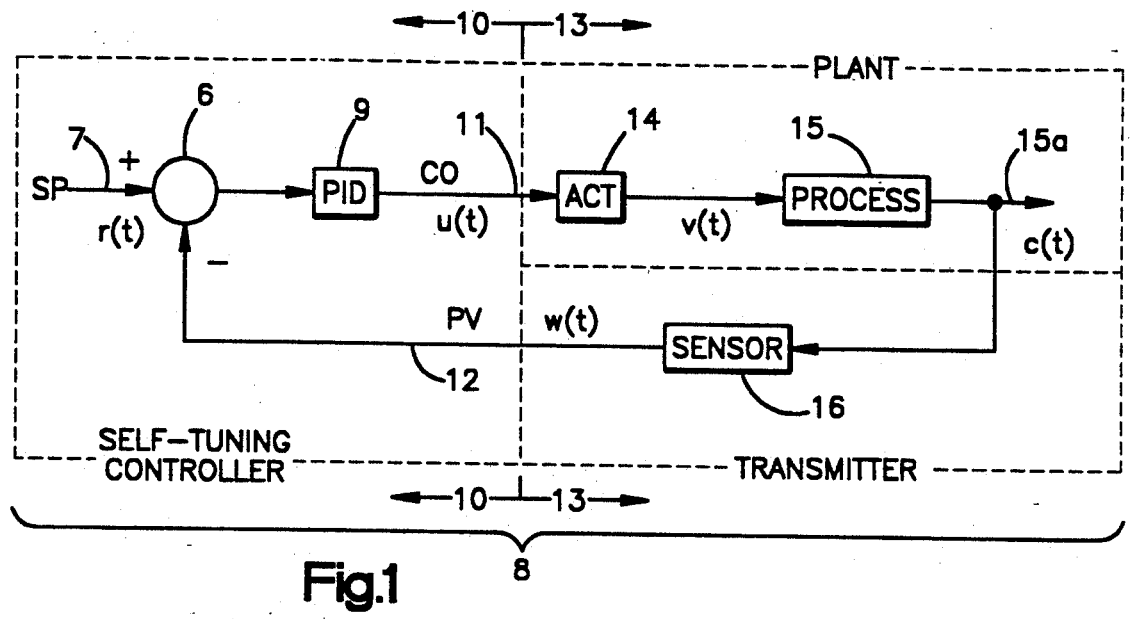
FIG. 1 is a block diagram of a process control loop which includes a self-tuning controller in which the present invention can be used.

Depicted in FIG. 1 is a block diagram of an industrial process control loop 8 which includes a self-tuning controller 10 and a process 15 having an actual process output 15a that is characterized by a sensor 16 into a process variable, such as but not limited to pressure, temperature, level or concentration. Coupled to receive the actual process output 15a, sensor 16 operates to produce the process Variable ("PV") at the input 12 of controller 10. The PV represents the value of the actual process output 15a.

The controller 10 comprises PID unit 9 which includes therein the PID algorithm. The desired value of the actual process output 15a appears at input 7 of the controller as the setpoint ("SP"). The controller 10 generates at its output 11 the control output ("CO"), in response to the PV at the input 12 and the SP input 7. The CO is calculated per the PID algorithm. The control output is transferred to the process 15 through actuator 14. For all practical purposes the controller 10 views the actual process 15 that it is controlling as a field process system 13 which is the combination of actuator 14, process 15 and sensor 16.

Figure 2:
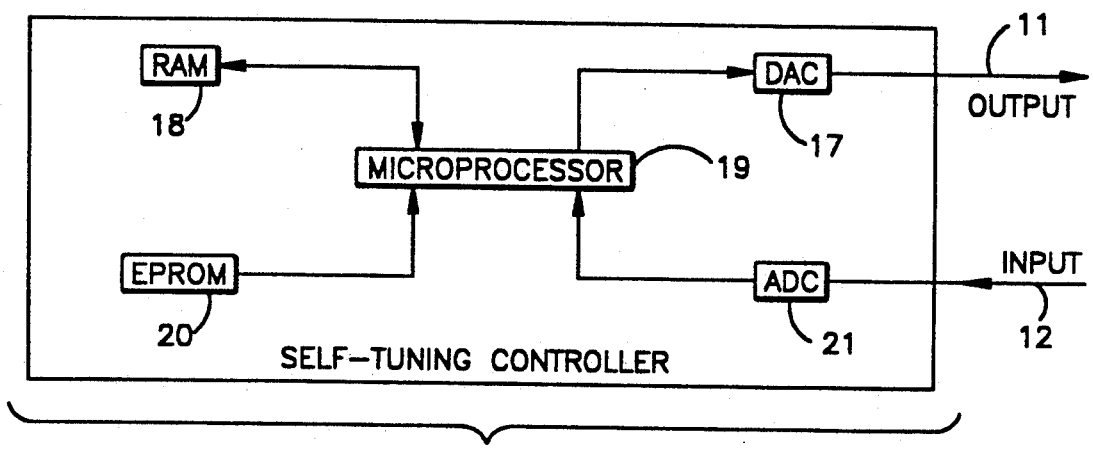
FIG. 2 is a simplified block diagram for the self-tuning controller of FIG. 1.

Referring now to FIG. 2, there is shown a simplified block diagram for self-tuning controller 10. Controller 10 includes microprocessor 19 which can change the control output at output 11 through digital to analog converter (DAC) 17 and can monitor the PV (an analog signal) at input 12 through analog to digital converter (ADC) 21. Associated with microprocessor 19 are random access memory (RAM) 18 and erasable programmable read only memory (EPROM) 20. The internal program for running the microprocessor 19 is stored in the EPROM 20. The ADC 21 converts the analog PV at the input 12 which represents the value of the actual process output 15a to a digital signal. The microprocessor 19 can use the RAM 18 to store data such as the digital signal which represents the value of the actual process output. The program executing in EPROM 20 tells the microprocessor 19 how to manipulate the data in RAM 18 or how it should change the control output at the output 11 of controller 10. The DAC 17 converts the digital control signal generated by the microprocessor into the analog control output at output 11.

The controller 10 acts on the field process system 13 at certain discrete intervals of time, commonly referred to as control cycles. The sampling time for the ADC 21 is usually the same as the control cycle.

A problem arises when a self-tuning controller 10 which does not incorporate the present invention attempts to analyze the open loop step response of field process system 13. As has been previously described, industrial processes are typically overdamped and of multiple-order, i.e. they have more than one pole. In addition, the typical industrial process usually has a couple of dominant poles (one more dominant than the other) that are mainly responsible for the response of the process. As will be described in more detail hereinafter, the incorporation of the present invention in controller 10 allows for a more practical, memory efficient, and precise overall deadtime and time constant characteristic approximation for a multi-order open loop step response then can be provided by using any one of the methods of the prior art in controller 10.

As in the prior art methods described above, it is desirable to determine the maximum slope of the open loop step response. However, as described, the prior art methods consist of drawing a tangent line to the maximum slope on the plot of the open loop step response curve. The manner in which the present invention determines maximum slope is described below.

Figure 3:
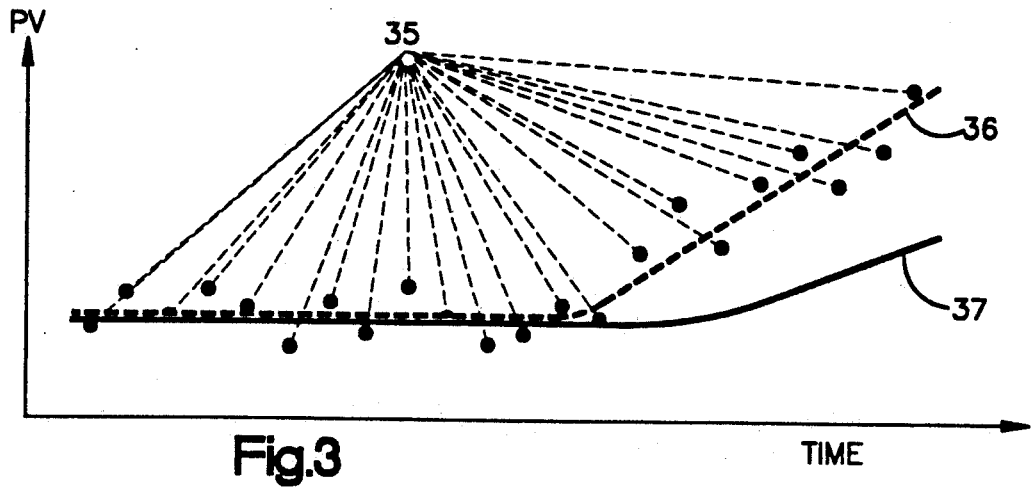
FIG. 3 is a graph showing sampled process response data to a step input versus time and the effect that a lag type filter used for noise rejection has on the data.

There is a certain amount of noise that is inherent in an industrial process. Methods used to determine values such as the slope of a signal must have some noise rejection properties. As is shown in FIG. 3, the use of a lag type of filter on the signal, in order to dampen noise, is not the answer because the filter will distort the true slope trend 36 of the response data 35. The effect that a lag filter will have on the sampled response data is shown as 37 in FIG. 3. Therefore, a filtering method that uses actual measurement readings, in other words not a lagged value, is required.

Figure 4:
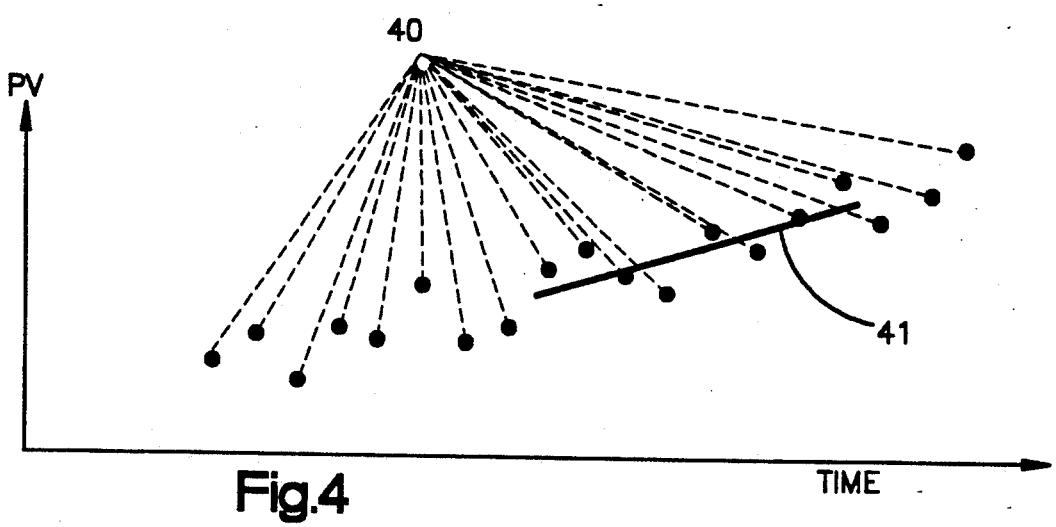
FIG. 4 is a graph showing nonmonotonic sampled process response data to a step input versus time.

A method that includes a filter that ignores data points which are not monotonic is also undesirable, since a very slow responding process may appear as all noise. FIG. 4, displays the response of a process in which the sampled response data 40 is non-monotonic. However, as shown at 41 the invention maintains the slope trend integrity. It is worth noting that the prior art methods for measuring slope described in Kraus and Sakai, et al. do not appear to have noise immunity built into their slope determination method. Spacing out the measurements may slightly reduce the noise effect on the slope calculation; however, the more that the measurements are spaced out, the less will be the accuracy of the actual response slope.

Figure 5A:
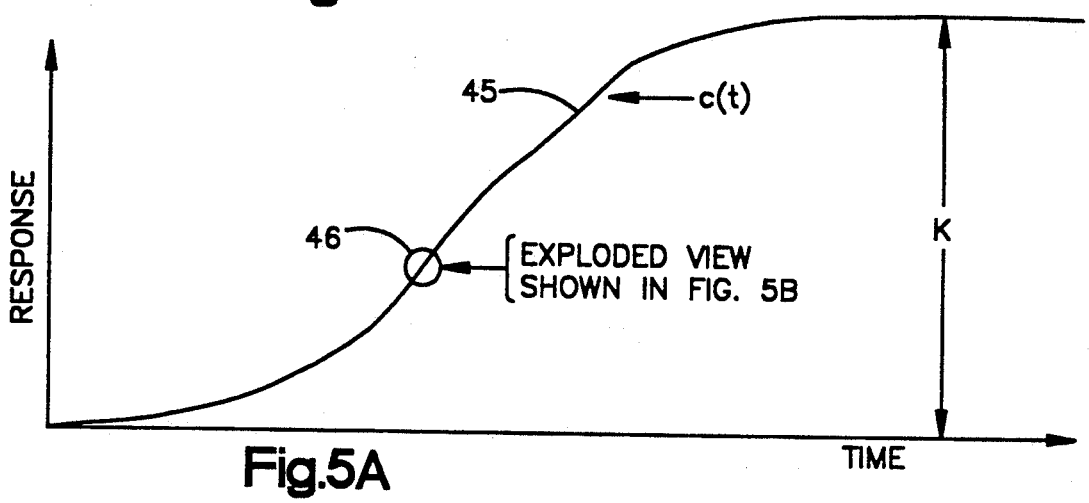
FIGS. 5A and 5B are graphs which show in FIG. 5A the actual response of a process to a step input and in FIG. 5B a detail of one part of the response of FIG. 5A.

The manner in which the present invention determines maximum slope will now be described. FIG. 5A shows the actual response 45 of a process to a step input. The section in the response denoted by circle 46 is shown in detail in FIG. 5B. The present invention calculates the slope of the response by storing the last eight measurements 50-57. The measurements 50-57 are taken every ADC 21 sampling period which may be the same as or different than the control cycle time of controller 10. The most recent four measurements 54-57 are averaged and the oldest four measurements 50-53 are averaged. The slope 47 is obtained by first subtracting the oldest four measurement average from the most recent four measurement average and then dividing the result of the subtraction by four times the sampling time.

As will be described in more detail hereinafter, the present invention compares the slope 47 to the maximum slope thus far of the process step input response. The previously calculated maximum slope was stored in RAM 18 of controller 10 along with the time of occurrence of that maximum slope and the value of the actual PV at that time. If the slope 47 is greater than the previously calculated maximum slope, the present invention stores the slope 47, its time of occurrence and the value of the actual PV at that time in RAM 18 in place of the corresponding values previously stored in the RAM.

At the next control cycle, the present invention repeats the calculation of the slope by:
i) storing the next eight measurements 51-57 and 59 (it should be appreciated that measurement 50, the oldest measurement of the previous control cycle, is not used);
ii) averaging the most recent four measurements 55, 56, 57 and 59;
iii) averaging the oldest four measurements 51, 52, 53 and 54;
iv) subtracting the oldest four measurement average from the most recent four measurement average;
v) dividing the result of the subtraction by four times the sampling time;
vi) comparing the newly calculated slope with the maximum slope calculated thus far and stored in RAM 18; and
vii) substituting the newly calculated slope, the time of its occurrence and the value of the actual process output at that slope in RAM 18 in place of the corresponding values previously stored in the RAM if the newly calculated slope is greater than the maximum previously calculated.

Figure 5B:
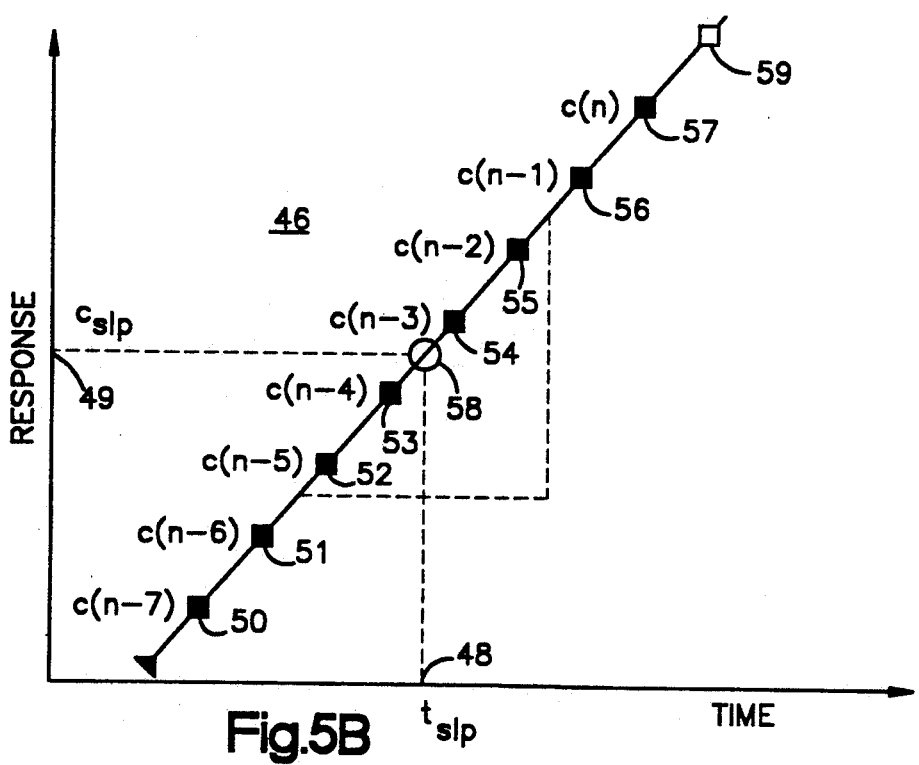

It should be appreciated that for each subsequent control cycle even though FIG. 5B does not show any measurements beyond 59 the present invention will continue to perform the steps set forth above until it is determined that the response to the step has reached the steady state condition. In each control cycle the present invention is checking to see if the response to the process step input has reached the steady state condition. At that time the present invention will no longer calculate the slope. It should further be appreciated that when the response has reached the steady state condition, the present invention will have resulted in the maximum slope, the time of its occurrence and the value of the actual PV at that time stored in RAM 18.

Alternatives to the slope determining method described above include either:
i) changing the number of measurements to store, or
ii) averaging a different number of recent measurements than the number of older measurements, or
iii) scaling the divisor with or without changing the sampling time.

Using an alternative slope determining method may be desirable depending on the specific application. Storing $2^n$ points (where n is an integer) can allow a quick divide by using exponent shifting. This can help save some floating point processing time. Having more storage of measurements allows better noise filtering; however, it increases process time and consumes more memory. Furthermore, there is a tradeoff of noise immunity versus the true calculation of slope. The smaller the distance between points on a curve, the better the approximation will be to the slope of those points within the interval. On the other hand, the more points which are averaged provides better filtering of noise, but with a loss of slope integrity. In summary, taking an approach nearing either of these extremes would not work well in the real world. Furthermore, a pure moving average or lag filter on the slope measurement or just calculating slope between two measurements in the present invention would not work well on a real world, i.e. inherently noisy, industrial process.

The present invention provides noise immunity to measuring the slope. It does not distort the trend of the measured values. Since industrial processes typically have a dominant time constant of at least seconds, the error in using only eight measurements is practically negligible when the input is sampled at a reasonable rate, i.e. at least four (4) times per second. In an application where the process responds slowly, i.e. has a large time constant, the slope is still quite valid using the invention, since it continually averages out the noise (See FIG. 4).

In accordance with the present invention the microprocessor 19 (see FIG. 2) calculates the slope of the response of a step input to the process every control cycle. The maximum slope calculated by the microprocessor is stored in RAM 18. In each cycle the microprocessor compares the maximum slope stored in RAM 18 to the slope it has most newly calculated. If the newly calculated slope is greater than or equal to the previously stored maximum slope, the microprocessor replaces the maximum slope previously stored in RAM 18 with the newly calculated slope. Included in the replacement, is storage of the value of the new maximum slope 47 (see FIG. 5B), the assigned measurement value 49 and the assigned time 48 of the point 48. In the example illustrated in FIG. 5B the assigned time 48 is considered to be essentially half way between the time of occurrence of points 53 and 54. It should be appreciated, however, that the assigned time 58 can be anywhere within the range of time defined by points 50–57 and the assigned measurement value 49 can be anywhere within the range of measurement values defined by points 50–57.

All eight points 50 to 57 can be averaged for more noise rejection. Alternatively, any balanced number of points, i.e. the same number of points on either side of assigned time 48, can be averaged for more accuracy of the amplitude 49. The immediately following successive control cycle would use points 51–57 and 59 to determine the next value of slope. This procedure is repeated for each control cycle until the present invention has determined that the response has reached the steady state condition. It should be noted that the invention allows the slope 47 to be calculated very easily every cycle thereby permitting numerous points of the response to be analyzed which yields more precise results.

Practically all industrial processes are characteristic of at least two poles if not more. A good estimate of a typical industrial process is an overdamped system with two poles and therefore two time constants in which one differs by ten times the other. This alone guarantees that the maximum slope will not be at the start of the rise as a pure first-order response does, and that the invention will therefore out perform the prior art Ziegler-Nichols method. As previously described, the Ziegler-Nichols method assumes that the time constant is inversely related to the maximum slope according to Miller, et al. The present invention does not make this assumption.

Figure 6:
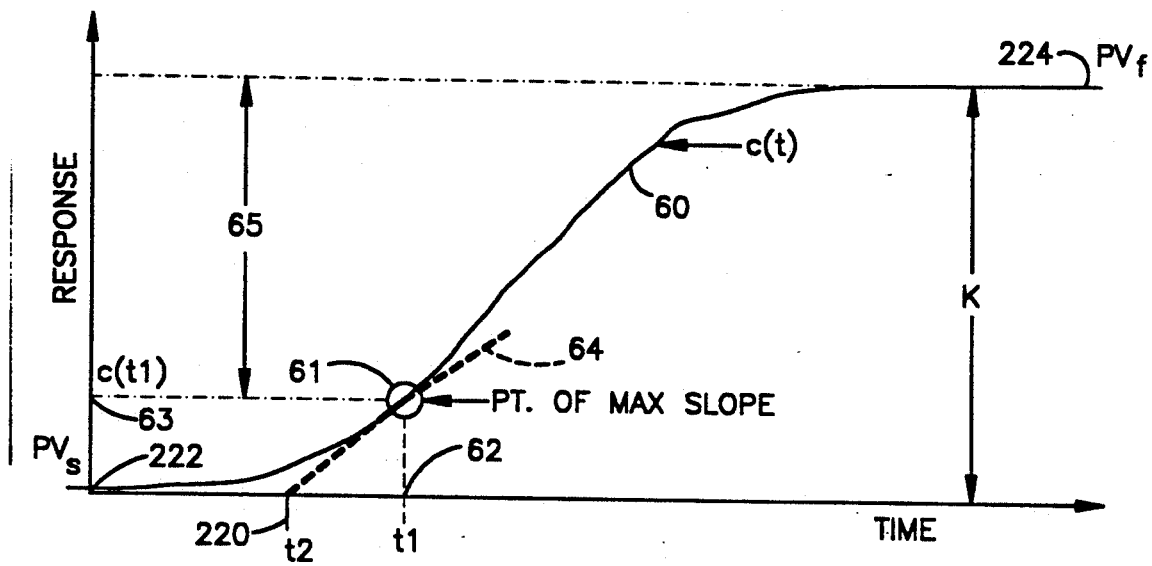
FIG. 6 is a graph showing the maximum slope for the response of FIG. 5A determined in accordance with the present invention.

Referring now to FIG. 6, there is shown the maximum slope determined as set forth above applied to the actual response 45 shown in FIG. 5A. My method determines the additive equivalent of the two time constants assuming a second-order process with one time constant ten times the other. The exact point where the response of the second-order system to a step input ("second-order response") reaches its maximum slope will be the equivalent of the response of a first-order system to a step input ("first-order response") with a time constant equal to the summation of the two second-order process time constants. In arriving at the above, I reasoned that the fastest response (maximum slope) 64 must be the point 61 where the two time constants act additively, because it is not possible to respond faster than the two as first-order responses in series.

The present invention provides the extra information about the process, namely that the maximum slope occurs where the time constants are additive, which allows the process to be more accurately approximated. The following is a time domain solution of a second-order step response:

$$c_s(t) = K \left[ 1 + \frac{\tau_1 e^{-t/\tau_1} - \tau_2 e^{-t/\tau_2}}{\tau_2 - \tau_1} \right] \quad [1]$$

Where $\tau_1$ and $\tau_2$ are the time constants of the second-order process and t is the time. Although a time constant ratio of ten to one is reasonable for many industrial processes, the invention allows the flexibility to choose the time constant ratio based upon the process type or other criteria for the application. In a specific temperature application the time constant ratio of the process may be chosen as 20:1, whereas in a specific flow application the ratio may be chosen as only 5:1. Using equation [1] with the relationship of $\tau_1$ equal to ten times $\tau_2$, the following equation is arrived at:

$$c_s(t) = K \left[ 1 + \frac{e^{-t/\tau_1} - 10 e^{-t/10\tau_1}}{9} \right] \quad [2]$$

The present invention samples the level of the process variable in order to determine if the process is in the steady state condition. The process must be in the steady state condition before the control output step is applied to the process. The amplitude of the control output step should be chosen to be high enough to obtain the characteristics of the process but not so high that the nonlinearities of the field process system influence the results. A reasonable step amplitude is 20% of the 0% to 100% controller process variable span. As was described in connection with FIG. 5B, the present invention will continue to calculate the slope until it is determined that the response to the control output step has reached the steady state condition. FIG. 6 shows at 222 the level $PV_s$ that the process variable has just prior to the application of the control output step to the field process system 13. FIG. 6 also shows at 224 the level PV$_f$ of the process variable when the response to the control output step reaches the steady state condition.

Figure 13:
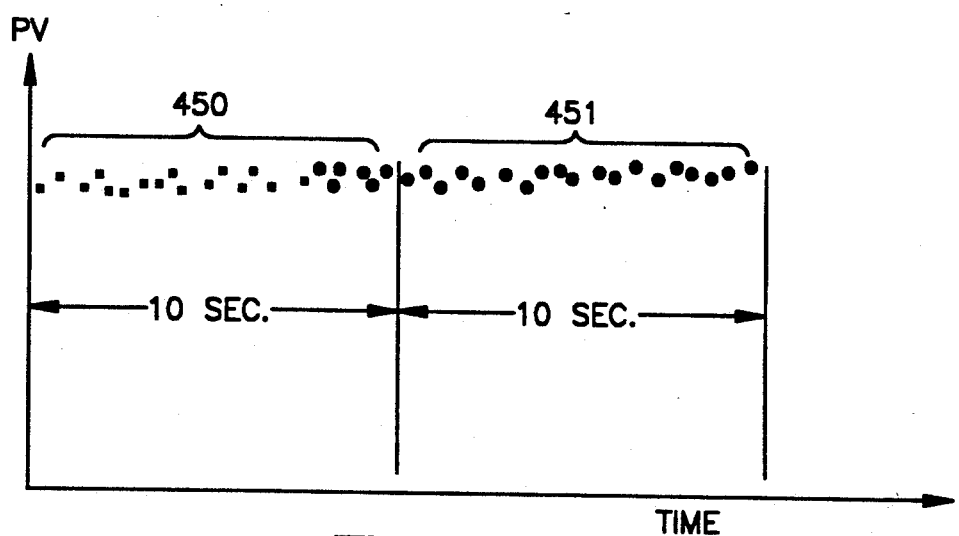
FIG. 13 is a graph which shows the sampling of the process variable over two selected time intervals.
Figure 14:
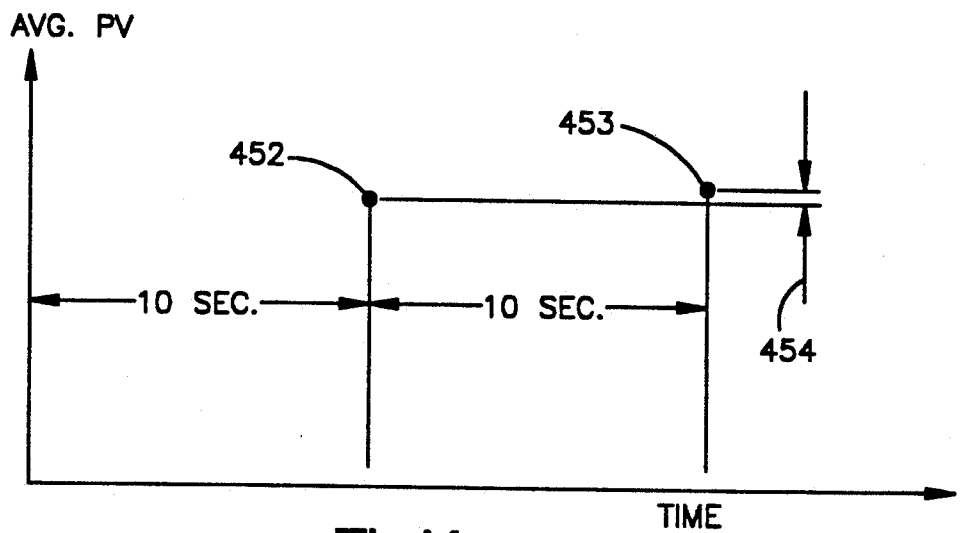
FIG. 14 is a graph which shows the results of the sampling shown in FIG. 13.

The technique by which the present invention determines if the process is in the steady state condition will be described. The steps of the technique are:
i) averaging the process variable PV values in 10 second period intervals. An alternative function to averaging is to lag the PV values with a time constant of 10 seconds for 10 seconds. FIG. 13 shows a number of data points for PV in two 10 second period intervals 450, 451.
ii) Storing the averaged or lagged value of PV for the last 10 second interval. FIG. 14 shows the resultant average 452, 453 of the data points of FIG. 13 at the end of the 10 second period intervals 450, 451.
iii) Monitoring the averaged or lagged value for a change in direction 454 from increasing 455 to decreasing 456 or from decreasing 458 to increasing 459 as shown in FIG. 15.
iv) Keeping count of the number of 10 second intervals that go by before the increase/decrease state changes from what it was.
v) Determining if the number of intervals and maximum deviation are indicative of the requirements which are set to define steady state.

To be considered in the steady state condition, the maximum deviation must be less than one percent (1%) divided by the number of intervals it took for the increase/decrease state change to occur. The minimum amount of maximum deviation would be set at 0.00153% to reflect the floating point round off limitations with a 16 bit mantissa. This could find a steady state condition repeatable up to a system with a time period of 1.8 hours. Naturally, using more precision floating point or longer time intervals would allow longer process time periods to be measured. Likewise, shorter time periods would allow a quicker return when steady state is reached; however, an interval of 10 seconds seems to be a reasonable time period for most industrial processes. Not only can the time interval be changed for certain applications, but, the maximum deviation can be set larger or smaller to fit a particular application.

Figure 15:
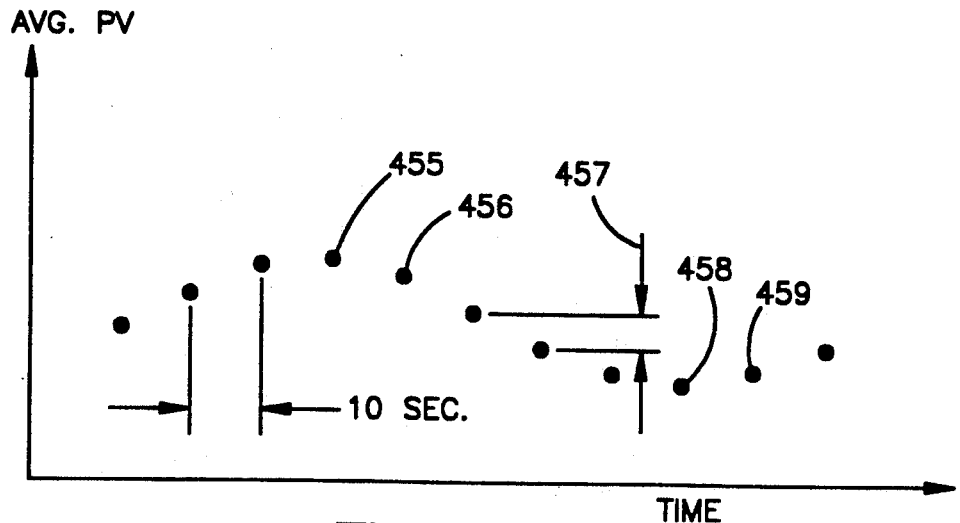
FIG. 15 is a graph which shows the results of sampling the process variable over many of the selected sampling time intervals.

FIG. 15 shows an example of a set of time averaged data points as applied to a specific application. The intervals show the first change from increase to decrease state is from point 455 to 456. The decrease to increase state is found from point 458 to 459. Notice that it takes six (6) intervals from point 456 to 459 in order to change increase/decrease states in this example. During the increase/decrease to decrease/increase state period, the maximum deviation from sample to sample is stored. The maximum deviation in this state period is during interval 457. As soon as this increase/decrease to decrease/increase time period is done, note the number of intervals it took. In this case deviation 457 must be less than 0.167%, (1%/6 intervals), to be considered in steady state.

An alternative method for determining steady state uses the information based on the maximum slope of the step response. For practical purposes we can assume that a settling response from a step input is close to a decaying sinusoid in nature. From this approximation we can assert that maximum slope is related to the period of the oscillation. Up to the first peak of a process step response a half cycle of $(A)SIN(\omega t)$ can roughly approximate the relation of maximum slope to the period of oscillation. The slope of $(A)SIN(\omega t)$ is its derivative $(A\omega)COS(\omega t)$. Where $(A)$ is the peak amplitude, $\omega$ is the angular frequency and $t$ is time. The maximum slope is where $COS(\omega t)$ equals 1; hence, the maximum slope equals $(A\omega)$. Putting the maximum slope in terms related to the period T yields that maximum slope equals $(2\omega A)/T$. The PV peak to peak value of the step response is approximately $(2)(A)$. Therefore, using this relationship we can arrive at the following as an approximation of the natural period T:

$$\frac{(\pi)(\text{Peak to peak } PV)}{\text{Maximum Slope}} \qquad [2a]$$

Using this information about the process, a rough value of natural time period can be associated with the loop response. For example, we can analyze the peak to peak PV over a period of time that is approximately two natural periods long. This would help ensure enough time to catch at least one full period of maximum PV deviation. A maximum peak to peak PV deviation can be set to indicate steady state. For example, 2% is the maximum that the PV can change over the specified steady state check period of time. An alternative is to create an adjusting acceptable deviation in order to accommodate unknown settling processes. For example, over the first steady state check period the maximum deviation would have to be less than 1%, over the second steady state check period the maximum deviation would have to be less than 2%, then the next 3% and so on. It is easy to see that as time goes on the PV oscillation will eventually meet the maximum deviation; however, it would be advisable to put an upper limit such as if it does not meet the steady state requirement in ten (10) steady state check time periods then the loop is too oscillatory or unstable. As stated before, the maximum deviation and steady state time check period can be altered to fit a certain application.

A response start detector is a further part of the invention. The response start detector determines the point in time when the transport delay (which will be defined below in connection with FIG. 7) has elapsed. There exists transport delay in many industrial processes. Such delay may be due to the position of the sensor in the process. Transport delay is common in many industrial processes because it is normally desired for the controller output to effect the input of the process; however, the sensor measurement is desired at the process output. Therefore, there can be physical transport delay from the time the controller acts on the process and the time when the process output sensor sees this change.

Figure 12:
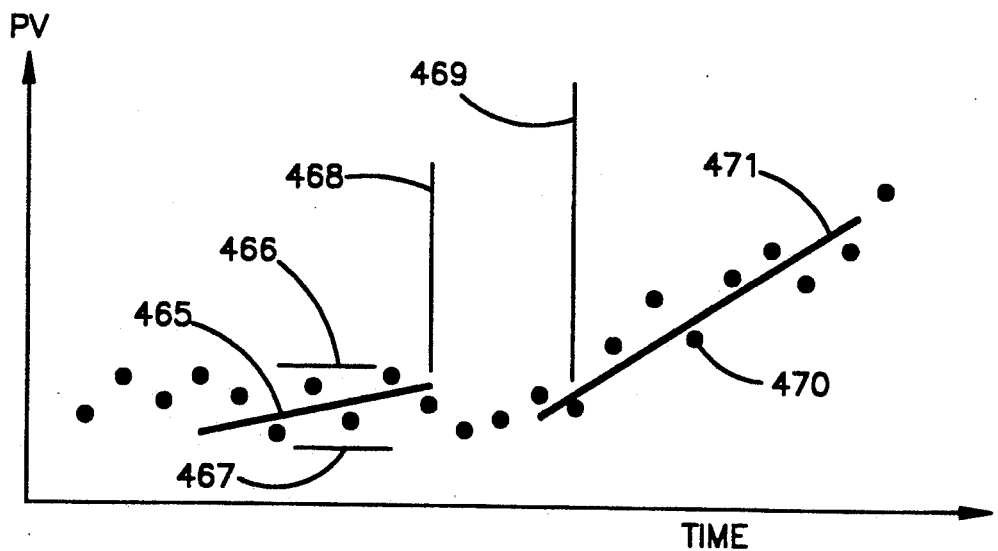
FIG. 12 is a graph which shows the analysis of the noise and the setting of the triggers used in steps 104 and 106 of the flowchart of FIG. 10.

The response start detector usually follows the steady state condition detector to assure the process is not moving. Once steady state is declared, the PV and averaged slope is monitored for the PV$_{high}$ 466, PV$_{low}$ 467, and maximum noise slope Slope$_{max}$ 465 over a time period of 20 seconds (see FIG. 12). The average PV (PV$_{avg}$) can be defined as the average over this time period or as (PV$_{high}$+PV$_{low}$)/2. For an application where an increase in control output causes an increase in PV, the PV trigger point 470 is when the PV is at least at the (PV$_{high}$+(PV$_{high}$−PV$_{low}$)) point, and in addition, the averaged slope 471 at this point 470 must be at least double the previous maximum noise slope Slope$_{max}$ 465. These two conditions help prevent false triggering of a response detect. Notice that this method helps account for inherent high frequency process noise as well as inherent electrical signal noise. Using the averaged slope 471 at this point, a response detect time can be back calculated and stored. Notice that the same type of response start detector can be used on a decreasing PV by setting the trigger point at ($PV_{low}-(PV_{high}-PV_{low})$) and functions in a similar manner in the other PV direction.

As an example, the $PV_{high}$ is 26.0% and the $PV_{low}$ is 24.0% making the $PV_{avg}$ equal to 25.0% and the maximum noise slope during this time is 2% per min. For a rising response, the trigger PV point is 25.0%+(26.0%−24.0%) which equals 27.0%. The minimum required slope is two (2) times 2% per minute which is 4% per minute. The example results with a 27.0% trigger point 470 and the average slope 471 happens to be 10% per minute at the 27.0% trigger point which exceeds the required 4% per minute. This surpasses the minimum slope and level trigger criteria; therefore, both response detect trigger requirements have been met. Now back calculating reveals that the response detect time is the trigger time at 470 minus (27%−25%)/10% per minute; hence, the response detect time is 0.2 minutes prior to the trigger time at 470.

Figure 7:
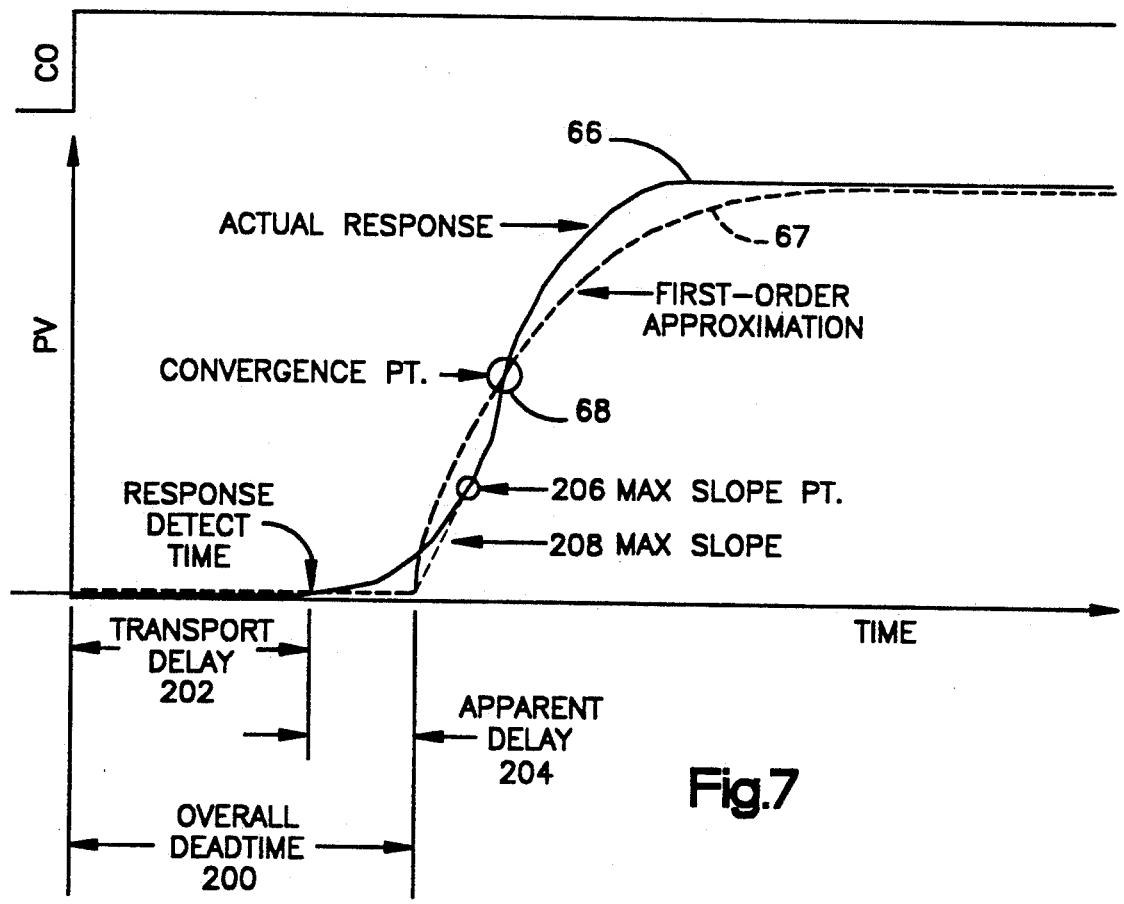
FIG. 7 is a graph which shows the control output step, the actual response of FIG. 5A, the approximation for the transport delay, apparent delay and overall deadtime and the associated first-order response and the desired level for the point of convergence of the two responses.

Referring now to FIG. 7, there is shown the step in the control output (CO), the actual second-order response 66, the approximation for the first-order response 67 and the desired level for the point of convergence 68 of the two responses 66 and 67. The terms "apparent delay" and "response detect time" will now be defined with reference to FIG. 7. Before doing that it is necessary to define "transport delay" because, as was previously described and as is shown in FIG. 7, the overall deadtime 200 is the sum of the transport delay 202 and the apparent delay 204.

The term "transport delay" refers to the transport of matter or energy from one physical place to another. For example, in a process involving the mixing of liquids in a tank to control pH in an acidic process, the valve which is used to control the rate of flow of the caustic liquid is located at the top of the tank while the sensor for pH is located at the outlet from the tank. If in response to the signal from the sensor the process controller 10 actuates the valve to increase or decrease the flow of the caustic liquid, it will clearly take some time for that increase or decrease of the caustic liquid which changes the level of pH in the mixture to travel to the sensor. That time is the transport delay. The point in time where the sensor first detects the change in pH is referred to as the response detect time.

The apparent delay 204 is the delay measured from the time the sensor associated with the process first detects the effect on the process of the control output, i.e. the response detect time, to the time when the present invention calculates the intersection of the maximum slope with the time axis. As can be seen from FIG. 7, the apparent delay 204 begins at the end of the transport delay 202.

Equation [2] can be set equal to the desired level for convergence point 68. A reasonable desired convergence point 68 is the half way point of the normalized step, i.e at 0.5, since it is desirable to choose a convergence point that is low enough to ensure a close approximation of the initial response. However, too low of a convergence point will cause significant error in the overall fit. For this reason, using a convergence point greater than three-quarters or less than one-third of the normalized step response is not advised in order to obtain the proper overshoot and response time for the PID controller. It should be noted that for $\tau_2=10\,\tau_1$, $\tau_1$ plus $\tau_2$ equals 11 $\tau_1$. Solving equation [2] yields that the point in time when the actual second-order response 66 will reach half way is $$0.72585\,(\tau_1+\tau_2). \qquad [3]$$

Those skilled in the art can easily determine mathematically that the time constant of a first-order response is 1.4427 times the time it takes for the first order response to reach the half way point of the step response. Therefore, the estimated time constant of the first-order approximation is simply:

$$1.4427(0.72585(\tau_1+\tau_2)-\text{Apparent Delay}). \qquad [4]$$

This equation [4] is a simple time saving and inexpensive approach to implement in order to find an optimum time constant approximation.

The equivalent ($\tau_1+\tau_2$) time constant will now be determined from the maximum slope. The time domain step response of a first-order system is simply:

$$1-e^{-t/\tau} \qquad [5]$$

and its derivative is $$\frac{1}{\tau}e^{-t/\tau} \qquad [6]$$

Recall that the derivative of a function returns a function of the slope. Hence, the time constant can be found given a slope 64 (see FIG. 6) and the corresponding amplitude 63 at point 61. Note that the amplitude 65 from the top of the response is equal to $e(-t/T)$, where t is the time 62. The invention states that the ($\tau_1+\tau_2$) time constant can be found from the time 62, maximum slope 64, and amplitude 63 of the point 61 of maximum slope. In addition, the process gain, if it is not unity, must be taken into account as a non-unity gain affects the slope to time constant relationship. Therefore, $\tau_1+\tau_2$ equals the normalized fraction of the amplitude 65 from the top step level multiplied by the process gain and divided by the maximum slope 64.

The difference between the Ziegler-Nichols method and the present invention is that the Ziegler-Nichols method assumes that the actual maximum slope determined is the same as the starting slope of the approximated first-order response. This is only true if the industrial process is purely first-order which is virtually never the case. However, even if it were, the present invention would still accurately determine the slope.

As will be described in more detail hereinafter in connection with FIG. 9A, even when the dominant time constant (dominant pole) is over 40 times larger than the next closest time constant (pole) which appears nearly first-order, the Ziegler-Nichols method results are still inferior to the invention (with the invention still assuming that the time constant ratio is ten to one).

Measurement devices have some time constant associated with them. Therefore, even if the process 15 were a true first-order system, the sensor 16 would turn the field process system 13 into a second-order system.

A particular industrial process will be examined to show the superiority of the invention as compared to the methods of the prior art. This process reflects a second-order system with one pole ten times the other. The dominant pole has a time constant of 30 seconds and the other pole has a time constant of 3 seconds. The s-domain representation of this process would appear as:

$$G_p(s) = \frac{1}{(30s + 1)(3s + 1)}. \quad [7]$$

The open loop step response of the process in the s-domain can be obtained by multiplying equation [7] by a factor of 1/s. The s-domain open loop transformed unit step response is $$c(s) = \frac{1}{s(30s + 1)(3s + 1)}. \quad [8]$$

The open loop step response of the process in the time domain can be obtained from equation [8] by using an inverse Laplace transform. The time domain open loop step response is:

$$c_s(t) = \left[ 1 + \frac{e^{-t/3} - 10e^{-t/30}}{9} \right] \quad [9]$$

where t is time in seconds starting at zero. The slope of this response can be determined by the derivative of the response. The slope of this response is given by $$\frac{d c_s(t)}{dt} = \left[ \frac{e^{-t/30} - e^{-t/3}}{27} \right]. \quad [10]$$

In order to provide an easy and clear description of the invention, only the solutions and results are shown; because, these mathematical equations, derivations, and solutions are obvious to anyone skilled in the art.

The step value is normalized to one; hence, any reference to magnitude will be with respect to this normalized value of one throughout this description. Likewise, process gain is assumed as one.

The exact values for the actual second-order response are as follows:
i) the maximum slope equals 0.02581;
ii) the time of maximum slope is at 7.675 seconds; and
iii) the amplitude value of the response at time equal to 7.675 seconds is 0.1483.

To prove the superiority of the present invention over the Ziegler-Nichols method, I allowed the Ziegler-Nichols method access to the exact data points and exact slope for the second-order industrial process step response with time constants of 3 and 30 seconds. I compared the result obtained using the Ziegler-Nichols method to the result obtained using the invention's method.

The Ziegler-Nichols method estimates the process as having an overall deadtime of 1.929 seconds and a time constant of 38.75 seconds. The Ziegler-Nichols method approximated response 72 is plotted against the actual response 70 in FIG. 8.

As mentioned previously, it will be shown that the Miller, et al. method can not be easily realized with a practical microprocessor based controller. This is because the controller can not tell where 63.2% of the step is until the top step level has been reached. This top step level will vary depending on the inherent process gain. For example, a 10 percent change to the process input could result in a 5 percent or a 15 percent change in the process output depending on the process gain. Obviously, storing the values at each cycle time is not practical, especially with a slowly responding process. This could take an enormous amount of memory. For example, a process with a two hour time constant and a controller having a 100 millisecond sample time, using a four byte representation of the measurement, would require over 10 million bits of memory just to store a single step response.

One alternative well known to those skilled in the art is to increase the sample time, for example from 100 milliseconds to one minute. Those skilled in the art recognize that such an increase would reduce the memory requirement but would not provide any useful data if the time constant of the process is on the order of a few seconds. Furthermore, even if the increase in sample time does provide useful data, those skilled in the art recognize that a substantial reduction in the accuracy of the slope approximation would result from the increase in sample time.

Another alternative well known to those skilled in the art is to rerun the step response a second time. The first step response can be used as a gauge of the process gain to predict the time that the 63.2% point will occur in the response to the second step. Of course, this assumes that the step response of the process is accurately repeatable. Rerunning the step response a second time means waiting nearly twice as long for the approximation to finish. This wait can be very frustrating especially on processes where the dominant time constant is on the order of hours. The invention on the other hand, gets around this limitation by predicting the actual response accurately the first time.

The invention is also superior to the methods described in Kraus and Sakai, et al. The method to determine the maximum slope in Kraus uses only five points of the response. As stated in Sakai, et al. (Column 11, lines 30-35), the Kraus method can not determine the maximum gradient line (slope) accurately. The invention is a vast improvement over the Kraus method.

The method stated in Sakai, et al. also bases maximum slope on a small number of points on the response curve. Furthermore, the correction factor which is used seems to assume that the industrial process step response will be first-order in nature, yet it is well known that industrial processes are characteristic of at least second-order responses. The invention proves to be more accurate, first by utilizing many more points, and secondly the invention takes into account that the industrial step response will appear as being at least second-order.

The invention assigns the overall deadtime to be 1.923 seconds with a second-order time constant summation of 33.00 seconds. The invention calculates the appropriate time constant approximation as 31.87 seconds. The response 71 calculated using the present invention is plotted against the actual response 70 in FIG. 8.

Figure 8:
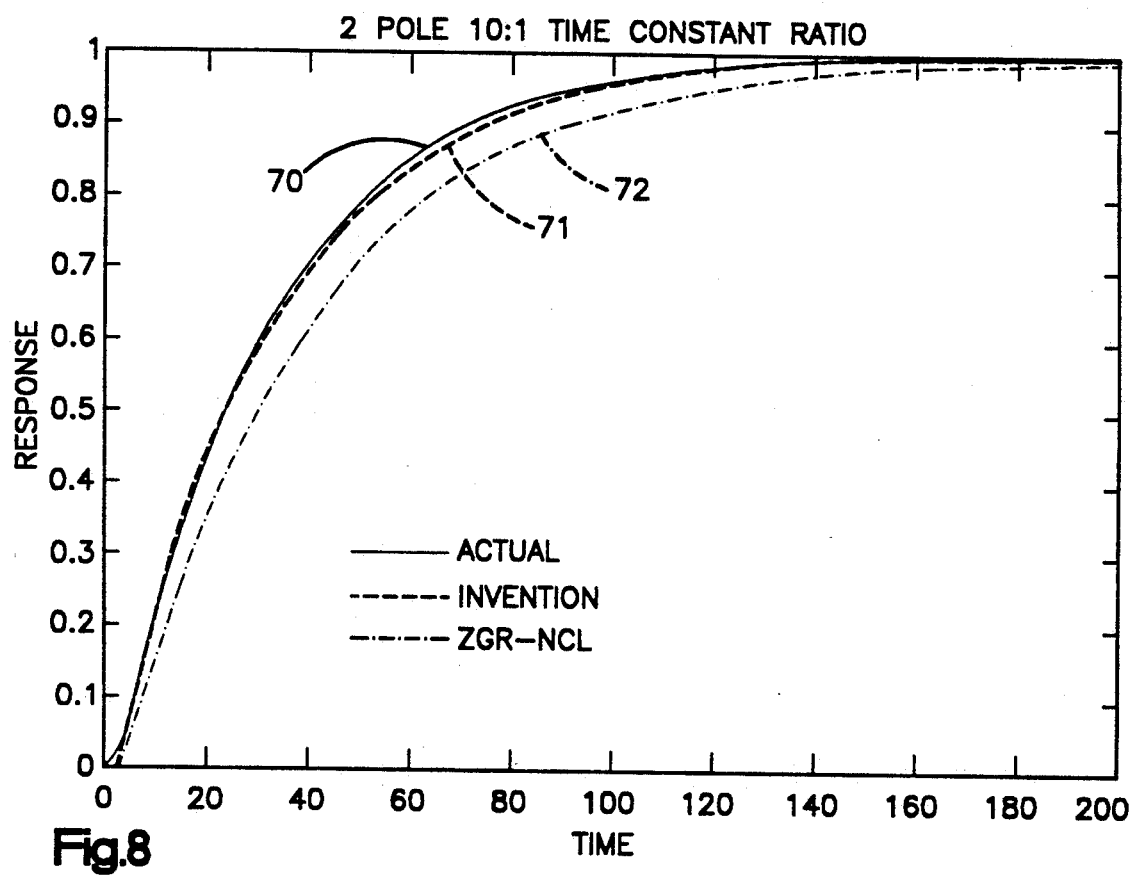
FIG. 8 is a graph which shows the actual response of a selected process having a time constant ratio of 10 to 1 versus the response for that process as determined using the Ziegler-Nichols method and the response for that process as determined using the present invention.

As can be seen in FIG. 8, the Ziegler-Nichols method approximated response 72 estimates the response 70 with too large a time constant.

Actual, the disclosed herein displays in FIG. 8 clear evidence of its superiority in matching the response 71 that it has calculated to the actual response 70. The invention yields an optimum match using a first-order approximation.

Figure 9A:
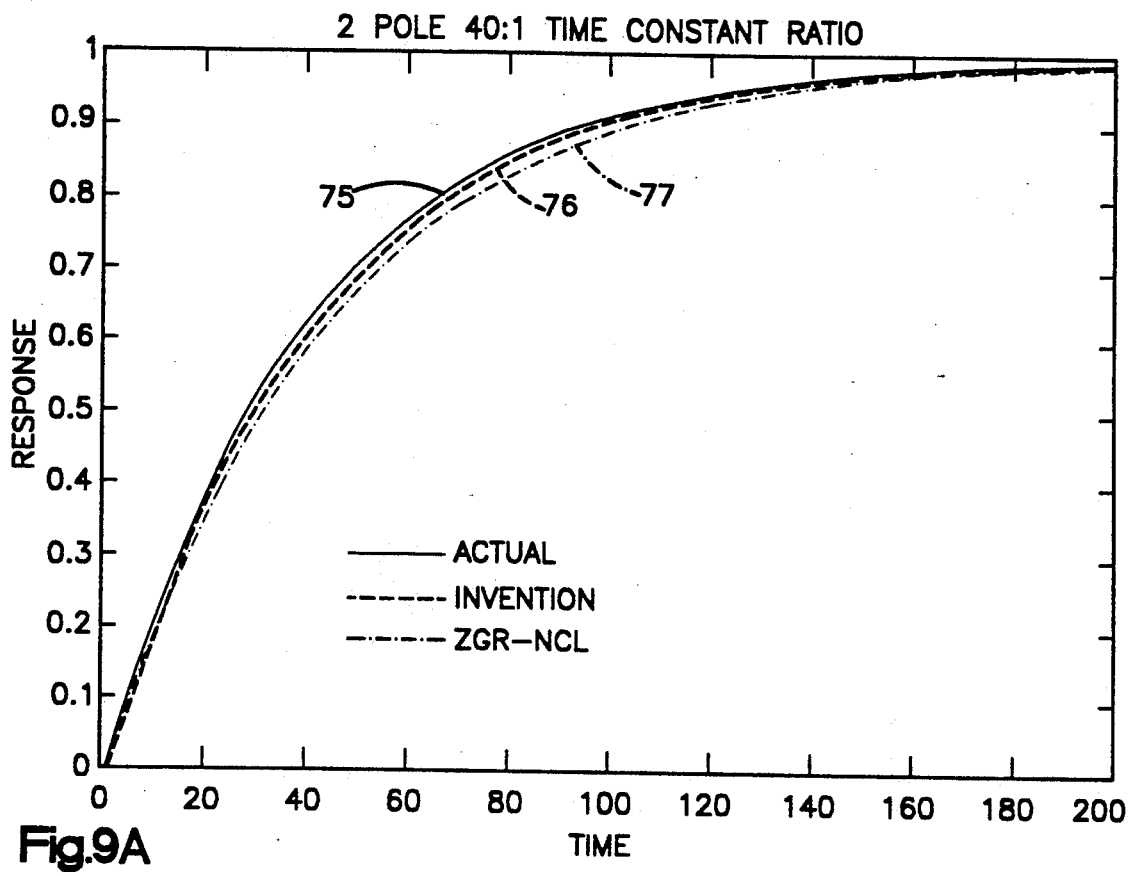
FIG. 9A is a graph which shows the actual response of another selected process having a time constant ratio of 40 to 1 versus the response for that process as determined using the Ziegler-Nichols method and the response for that process as determined using the present invention.

In FIG. 9A the actual response of an industrial process having a time constant ratio of 40 to 1 is shown as 75. The response of that process as determined by the Ziegler-Nichols method appears as 77. Even with the invention continuing to assume a time constant ratio of ten to one, the invention still yields a proper estimate as is shown in response 76 of FIG. 9A and out performs the Ziegler-Nichols method.

Figure 9B:
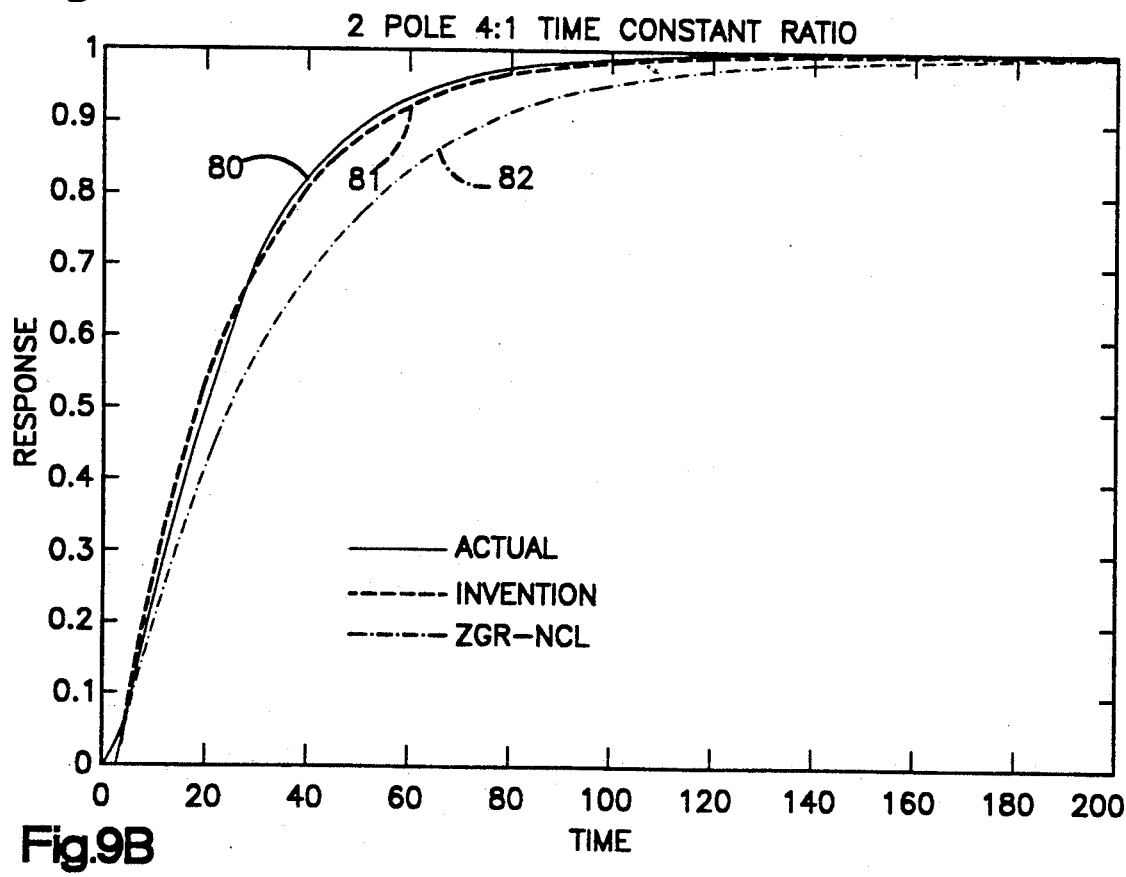
FIG. 9B is a graph which shows the actual response of a selected process having a time constant ratio of 4 to 1 versus the response for that process as determined using the Ziegler-Nichols method and the response for that process as determined using the present invention.

In FIG. 9B the actual response of an industrial process having a time constant ratio of 4 to 1 is shown as 80. The response of that process as determined by the Ziegler-Nichols method appears as 82. Even with the invention continuing to assume a time constant ratio of ten to one, the invention still yields a proper estimate as is shown in response 81 of FIG. 9B and out performs the Ziegler-Nichols method.

The main advantage of the present invention is that it reflects a far superior fit for typical industrial process open loop step responses for a self-tuning controller. This invention yields an improved method to approximate higher-order systems in industrial control process applications by a first-order model with delay using a self-tuning controller. This advantage carries over into a more accurate realization of finding optimal PID values for the self-tuning controller of the process, regardless of which optimum criteria is used. Thus, this improved process approximation means less waste, improved efficiency, cost savings, superior products, or the many other advantages of having better control. In addition, this type of method used for a self-tuning controller allows the realization of the invention with inexpensive microprocessors, low memory usage, and with low microprocessor burden time.

The present invention can be applied to a variety of different industrial control process applications. Note that the overall deadtime and time constants of the field process system 13 can vary greatly depending on the application; yet, the invention can still be effective. Once again, as stated above, the number of measurements stored, the ratios of averaging, averaging assignment amplitude, the assignment of time to the slope calculated, the desired level for the convergence point of the actual second-order response with the first-order response, the characteristic industrial process time constant ratio for the second-order response (possibly based on the application), can all be altered; however, the basis of the invention will still remain intact.

Figure 10:
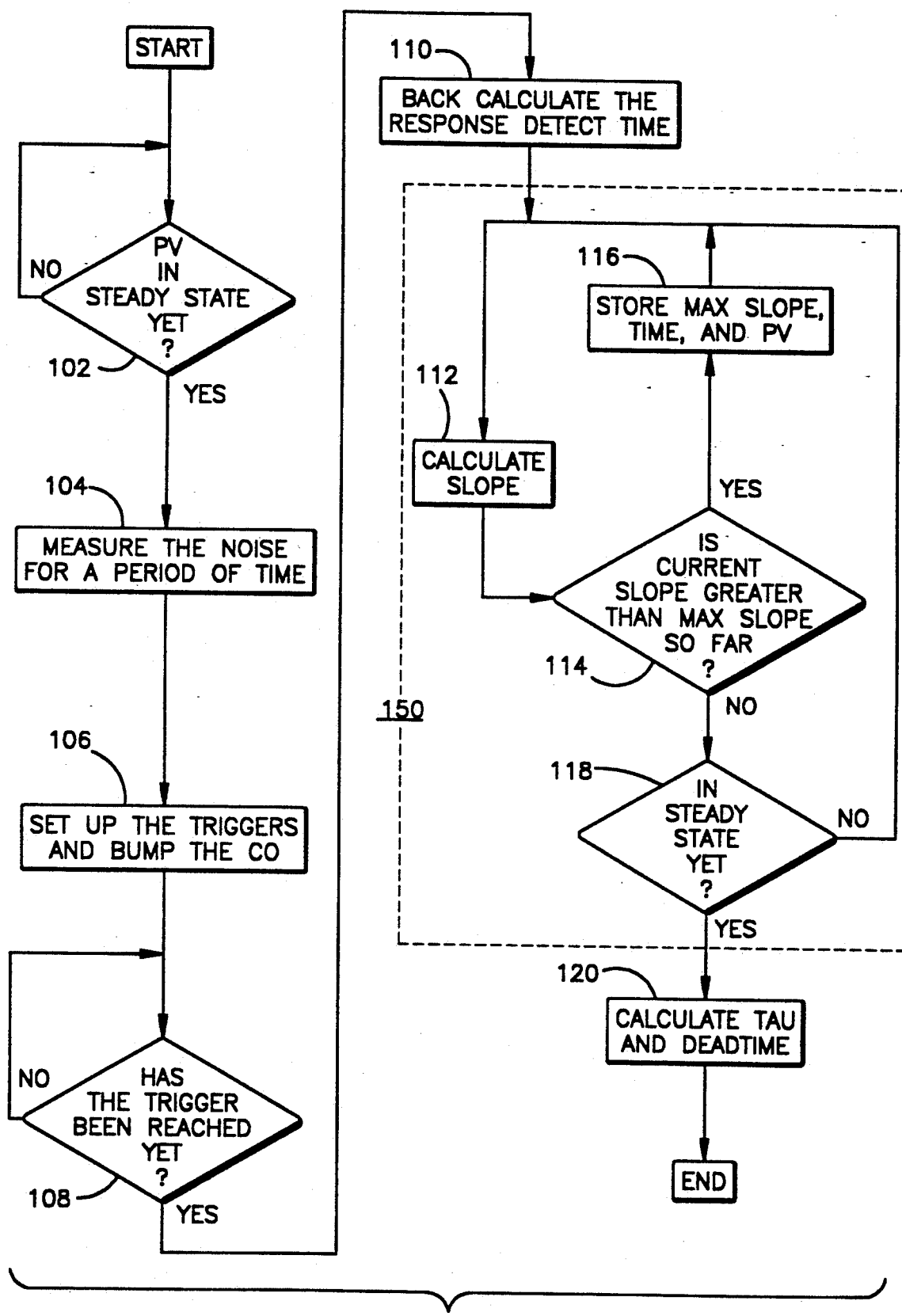
FIG. 10 is a flowchart of a computer program which is used by the self-tuning controller in the practice of the present invention.

Referring now to FIG. 10, there is shown a flowchart 100 for a program resident in EPROM (see FIG. 2 which is used by the microprocessor 19 of controller 10 in the practice of the present invention. The first step 102 of the program represented by the flowchart 100 is the determination by controller 10 if the process variable (see FIG. 1) has reached a steady state value. The program will continue to execute step 102 until such time as the process variable reaches the steady state condition. The technique by which the present invention determines if the process variable has reached its steady state value, i.e. is in the steady state condition, was previously described in connection with FIGS. 13, 14 and 15.

Once the program determines that the process variable has reached its steady state value the program proceeds to step 104 wherein the controller measures the noise for a predetermined period of time. After measuring the noise for that period of time the program in step 104 calculates the average noise and the maximum slope thereof. The length of time for which the program measures the noise in step 104 is arbitrary and in one embodiment for the program represented by flowchart 100 the predetermined period of time was set at 32 seconds.

After executing step 104 the program proceeds to step 106 wherein it first sets the level and slope triggers and then causes a control output step. The level trigger is a predetermined level that the process variable must surpass in response to the step in the control output. The slope trigger is a predetermined slope value that the process variable response slope must surpass in response to the step in the control output. In step 108 the program determines if the process variable has reached both trigger requirements. Once step 108 determines that the process variable has reached the trigger requirements the program proceeds to step 110 wherein the response detect time is calculated.

After calculating the response detect time, the program proceeds to loop 150 which comprises steps 112, 114, 116 and 118. In step 112 the program calculates the slope of the response of the process variable using eight consecutive points as described in connection with FIG. 5B. After calculating the slope, the program in step 114 determines if the slope calculated in step 112 is greater than the maximum slope calculated thus far for the response to the control output step provided by step 106. As was described above, the previously calculated maximum slope, the assigned time of occurrence of the maximum slope and the assigned value of the process variable at that slope are stored in RAM 18 of controller 10 (see FIG. 2). If the slope calculated in step 112 is greater than the previously stored maximum slope, the program in step 116 replaces the previously calculated maximum slope, its assigned time of occurrence and the assigned value of the process variable at that slope stored in RAM 18 with the new maximum slope, assigned time of occurrence of that slope and the assigned value of the process variable at the new maximum slope.

If the slope calculated in step 112 is not greater than the maximum slope previously calculated, the program using the technique described in connection with FIGS. 13-15 determines in step 118 if the response of the process variable from the control output step has reached the steady state condition. If steady state has not yet been reached the program returns to step 112 to calculate the slope and then to step 114 to compare the calculated slope to the maximum slope previously stored in RAM 18. It should be appreciated that when the program is finished executing the steps in loop 150, the maximum slope of the response of the process variable to the control output step will have been determined and stored in RAM 18 along with the assigned time of occurrence of that slope and the assigned value of the process variable at the maximum slope.

When step 118 determines that the process variable has reached the steady state condition, the program proceeds to step 120 wherein it calculates the time constant and the overall deadtime approximation. The overall deadtime 200 is calculated in step 120 from where the maximum slope intercepts the time axis (see FIG. 7).

Figure 11:
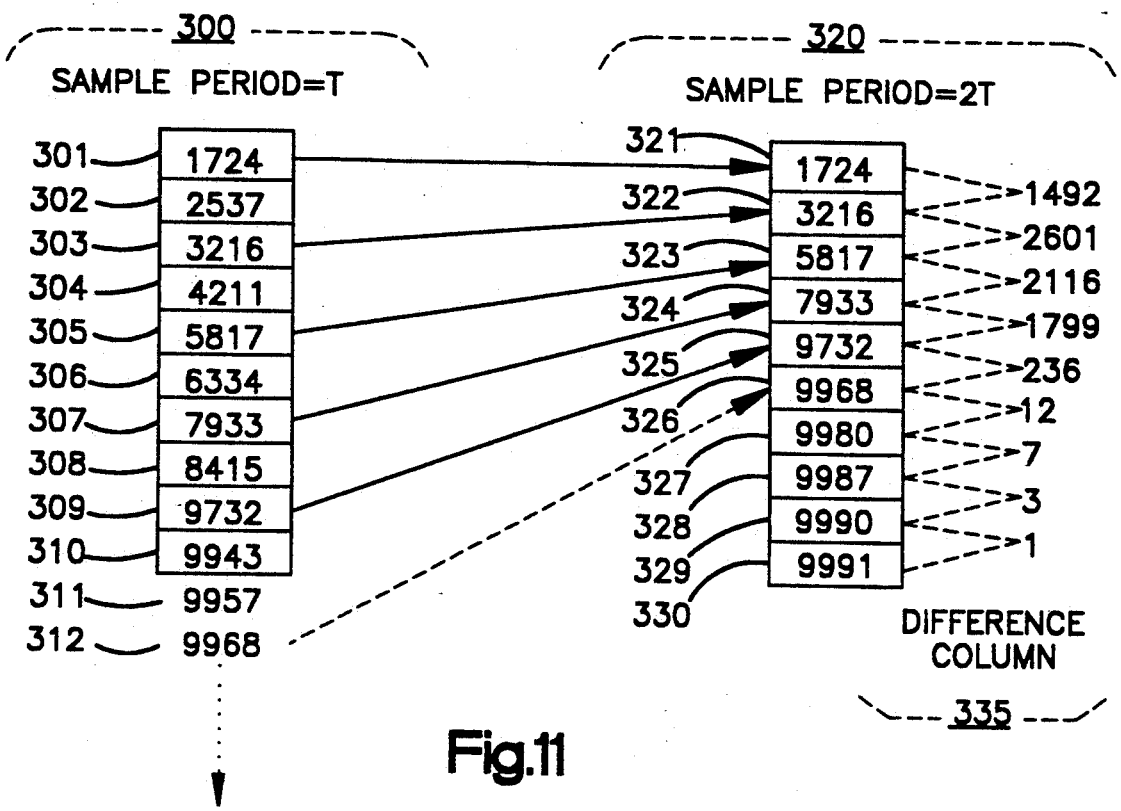
FIG. 11 shows a dedicated register bank for use in the alternative technique that can be used by the present invention to calculate the time constant.

This invention includes an alternative approach to solve the multi-order response first-order approximation problem as stated previously in a practical, memory efficient manner. The overall deadtime 200 (see FIG. 7) is determined by the maximum slope as before, along with storing the starting level $PV_s$ 222, the final level $PV_f$ 224, the maximum slope value 64, PV amplitude 63, and time 62 of maximum slope point as shown in FIG. 6. As is shown in FIG. 11 a set number of dedicated memory locations 301-310 are reserved in a register set 300 located in RAM 18 for storing the PV measurements at the output of ADC 21. These dedicated memory locations only start to fill every sample period after the response slope stops increasing.

For example, if from the time the control output step is applied, the slope of the response continues to increase for 37.75 seconds, then the dedicated register set 300 will not start having the PV measurements stored therein until after these 37.75 seconds have expired. If at 38.00 seconds the slope shows a sign of decrease from the previous slope then the PV measurement will be stored in the first location 301. If the slope continues to decrease, locations 302 to 310 will start to fill consecutively every sample period. However, if the response slope was decreasing and then starts to increase again, the filled registers 301 through 310 will be written over as soon as the slope stops increasing again starting with location 301 as was described above.

In addition, when the last available register 310 is filled, the response is checked for a steady state condition, before the next PV measurement 311 is taken. If the response data does not indicate a steady state condition, then every other measurement (302, 304, 306, 308, 310) is disregarded and measurements which remain (301, 303, 305, 307, 309) get shifted down maintaining their chronological order as shown by locations 321, 322, 323, 324, 325 respectively of register set 320 in FIG. 11. It should be appreciated that register sets 300 and 320 the same register. The reason separate reference numerals are used is to show how the contents of the register change in each set. In other words, once the dedicated registers 301 through 310 are full and the process response is not in a steady state condition, half of the registers will be freed up for new measurements which are sampled now at half the previous sampling rate, hence, at double the previous sampling time. See FIG. 11 and examine the registers contents of the locations in register sets 300 and 320 as they change from 300 register content state to the 320 register content state. The arrows between the register sets 300 and 320 demonstrate how the register contents will transfer.

Successive PV measurements after the registers 301 through 310 have been filled are indicated as 311 and 312. Note that locations 301 through 312 are PV measurements indicative of the sample period T, and the PV measurements stored in locations 321 through 330 are representative of a sample period of 2T. The dotted line from location 312 to location 326 shows that once the contents in register set 300 are modified to register set 320 that the 311 PV measurement is passed over due to the 2T sample period and the PV measurement 312 is stored in location 326.

Observe that memory locations 306 and 326 are physically the same locations; however, 306 is the state of this location before the sampling period was doubled and 326 is the state of this register location after the sampling period was doubled. This statement applies to all the register locations; hence, register locations 301 through 310 are the exact same physical storage locations as registers 321 through 330, respectively, and the transformation from register set 300 to register set 320 clearly exhibits the change in the register contents once the sampling period is doubled. This procedure continues to repeat until the steady state condition has been established. Hence, if the steady state condition has not been met after register location 330 is filled, then the sample period will be doubled again to 4T and the contents of locations 321, 323, 325, 327, and 329 will replace the contents of locations 321, 322, 323, 324, and 325, respectively, and so on. A steady state check occurs only after the registers have been completely filled to the end, i.e. locations 301 through 310 or 321 through 330. The registered sampling period (i.e. T, 2T, 4T, 8T, or 16T, etc.) is stored so that a time frame can be assigned to the registered measurements.

The steady state detection can be based on the status of the values in the registers or as described previously. The maximum slope either from the earlier described method or determined from the contents of the current registers can be used to approximate "ball park" qualifying relationships that would be used to indicate steady state. These qualifying relationships, which are described in more detail below, help prevent false steady state detection from occurring. The register values can also be a validity check for the calculation of maximum slope using the previous slope method.

The first steady state condition qualifier which pertains to these registers is that the difference between register values must consecutively equal or decrease from the maximum difference. For instance, as can be seen from FIG. 11 the difference between the contents of locations 322 and 323 is the maximum difference between the contents of successive locations in the register set 320. The successive differences of the contents of locations 324 and 323 all the way through the difference of the contents of locations 330 and 329 continue to decrease as can be seen in the difference column 335. The second qualifier is that the maximum difference must be in the lower half of the register set (i.e. within registers 321 through 325). The third qualifier is that the difference between the contents of the final locations 330 and 329 must be less than 5% of the maximum deviation and the fourth qualifier is that the maximum deviation must be less than 25% of the overall step size ($PV_f$ 224 to $PV_s$ 222 in FIG. 6). The fifth steady state qualifier is that the register contents 321 through 330 must represent a period of time that is at least one natural time period long based on the maximum slope of the response or the maximum deviation of the registers. The sixth steady state qualifier, which is a good double check of slope measurement, is to compare the maximum slope stored and the maximum deviation slope from the register values and see if they agree within a factor of two (2). This would further substantiate that the register data as well as the maximum slope calculation are somewhat in agreement. It was already described how the maximum slope is related to the natural time period. The maximum slope determined from the maximum deviation in the register table would simply be the maximum deviation divided by the sampling period of the register set. All of the above qualifiers must be met in order for the PV to be considered in the steady state condition.

Clearly, an adjustment or modification of the above steady state qualifiers may be used as an alternative. An example of one such adjustment or modification would be to declare that the first steady state qualifier is not necessary to be considered in the steady state condition as long as the rest of the qualifiers are met. Another example is that the fifth and sixth steady state qualifiers are not necessary to be considered in the steady state condition as long as the rest of the qualifiers are met.

Undoubtedly, many permutations of qualifiers could be used to justify the steady state condition.

The closest register value to the 63.05% of the distance between the starting $PV_s$ 222 and the final $PV_f$ 224 is found. The value of 63.05% was empirically selected for the desired convergence point based on an optimized fit over a certain relative time frame between a first-order response and a ten to one time constant ratio response.

Once we determine the closest value to the 63.05% of step response register, we determine this registers actual fraction of the overall step response. We can call this the convergence fraction. A relationship between the convergence fraction and the time adjustment multiplier can be generated.

The objective of this relationship is to find a good first-order approximation of the process response. We know that the convergence fraction can be set equal to the first-order equation [5]. From this a relationship between the convergence fraction and the time adjustment multiplier can be derived as follows:

$$\text{TimeAdj.Mult.} = \left[ \frac{1}{-\ln(1 - \text{Cvrg.Frac.})} \right]. \quad [11]$$

This complex function can be reduced to linear segment interpolation given by the following table:

| Convergence Fraction | Time Adjustment Multiplier |
|---|---|
| 0.35 | 2.3020 |
| 0.45 | 1.6579 |
| 0.55 | 1.2446 |
| 0.65 | 0.9482 |
| 0.75 | 0.7190 |
| 0.85 | 0.5257 |

Notice that this table only covers a convergence fraction in the range of 0.35 to 0.85 since a measurement is practically guaranteed to be within this range; if the convergence fraction does not fall within this range then it is not recommended to use such a set of registered data and the procedure should be rerun.

For example if $PV_s$ is 0 and $PV_f$ is 10000, then the closest register value to 63.05%, or 6305 in this case, is 5817 in register 323. This ADC measurement happens to translate into the 58.17% point or in other words, the 0.5817 convergence fraction. From the relationship given in equation [11] we get a time adjustment multiplier of 1.1474. Therefore, the difference in time between the time of occurrence of this PV measurement in register 323 and the overall deadtime is multiplied by the 1.1474 time adjustment multiplier. For example, if the first dedicated register 321 started to fill at time 38.0 seconds and the current sample period is 2.0 seconds and the selected register 323 is two registers below the starting register 321, then the time occurrence of register 323 is at 38.0+(2 * 2.0)=42.0 seconds. Now if the overall deadtime was calculated to be 8.0 seconds, then we can find the first-order time constant approximation as $\tau_a = (42.0 - 8.0) * 1.1474 = 39.0$ seconds. This yields the approximated time constant $\tau_a$ which can be used in conjunction with the calculation of overall deadtime to represent the first-order approximation characteristics of the process.

Figure 16:
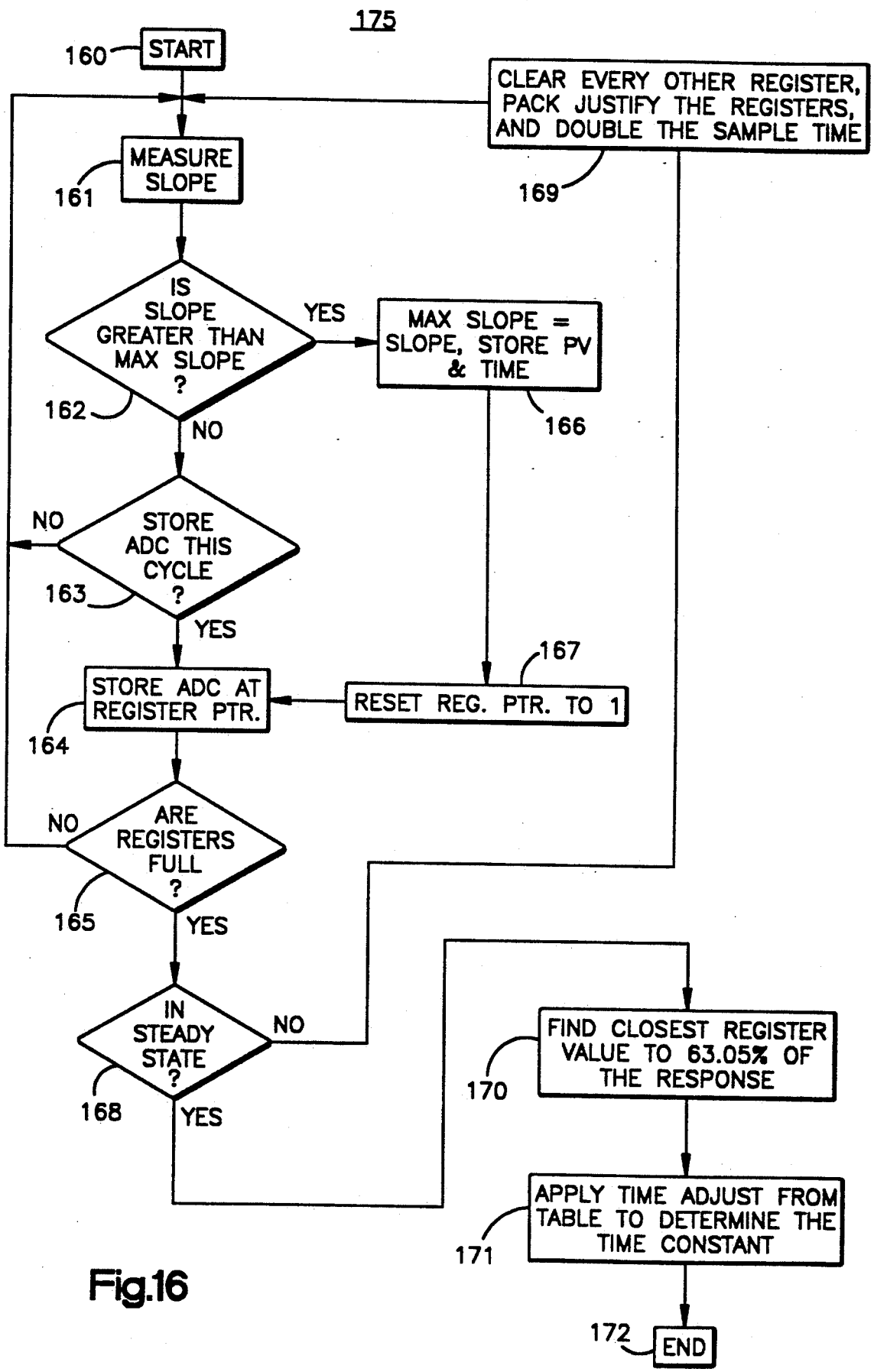
FIG. 16 is a flowchart of alternative computer program that can be used in the practice of the present invention to calculate the time constant.

Reference may now be made to FIG. 16 wherein a flowchart 175 is shown for a program which can be resident in EPROM 20 for use in the alternative method described above. It is not necessary to describe the flowchart of FIG. 16 as those skilled in the art will be able to relate the steps 160 to 172 shown therein to the previously described steps of the alternative method.

This invention can be applied to a variety of different industrial control process applications. The steady state detector may have different time intervals and maximum deviation settings to accommodate various application or implementation needs. The trigger point on the response detector can be raised or lowered.

It should be appreciated that the present invention allows a self tuning controller to obtain the characteristics of the field process system controlled by the controller by analyzing the open loop response of the process variable to a step applied at the controller's control output. The method approximates the higher-order field process system actual response with a first-order system response with pure time delay. The method determines the overall deadtime and time constant of the first-order approximation. The optimum PID values of the controller can be determined from well known techniques based on the desired criteria and the first-order parameters.

It should further be appreciated that two embodiments are disclosed for the present invention. In one embodiment the data from the actual response is assumed to be the data obtained from a second-order response having a 10:1 time constant ratio. That data is then used to determine the time constant of the first-order approximation. In the other embodiment the first order time constant is determined by using a convergence point falling within a predetermined range between the actual response data and the first-order approximation.

It should be further appreciated that in both embodiments the method determines the maximum slope of the process variable response to the step and stores that slope along with an assigned time of its occurrence and an assigned process variable. The stored information is used by both embodiments to approximate the overall deadtime and in the first embodiment to find the assumed second-order time constants which are used to find the first-order time constant. The first embodiment includes a technique for determining the response detect time so that the part of the overall deadtime which is the apparent delay can be calculated from the response detect time and the overall deadtime. The calculation of apparent delay is necessary in the first embodiment in order to find the time constant. In the second embodiment a PV measurement register manipulation technique which determines the convergence point is used to find the time constant.

The step is not applied to the control output until the process variable has reached the initial steady state condition and the calculation of slope ceases when the process variable response reaches the final steady state condition. The method includes alternative techniques for determining the steady state condition.

It is to be understood that the description of the preferred embodiments are intended to be only illustrative, rather than exhaustive, of the present invention. Those of ordinary skill will be able to make certain additions, deletions, or modifications to the embodiments of the disclosed subject matter without departing from the spirit of the invention or its scope, as defined by the appended claims.

What is claimed is:

1. A method for use in a self tuning controller to obtain the first order approximation characteristics of a field process system controlled by said controller, said first order approximation having a time constant and an overall dead time, said field process system having a process variable and a transport delay, said method comprising the steps of:
  i. applying a predetermined step input to said field process system;
  ii. determining the slope of the response of said process variable to said step input comprising the steps of:
    a. measuring first and second sets of samples of said process variable response, said second set delayed from said first set, said first set having a first predetermined number of said samples and said second set having a second predetermined number of said samples;
    b. calculating the moving averages of said first and second set of samples and the difference between said moving averages of said first and second sets; and
    c. dividing said difference by a predetermined divisor to find said slope;
  iii. determining when said slope is a maximum and defining a predetermined point within the range of points defined by said first and second predetermined number of samples associated with said maximum slope and measuring the time of occurrence of said predetermined point and the amplitude of said process variable step input response associated with said predetermined point;
  iv. determining when said process variable step input response is in a steady state condition and the amplitude of said process variable when said process variable step input response is in said steady state condition;
  v. calculating said first order approximation overall deadtime from said maximum slope, said time of occurrence and said associated process variable step input response amplitude;
  vi. determining from said overall deadtime and said transport delay the apparent delay of said process variable input step response; and
  vii. determining said first order approximation time constant from said maximum slope, said time of occurrence, said process variable step input response amplitude associated with said predetermined point, said process variable amplitude when said process variable step input response is in said steady state condition and said apparent delay.

2. The method of claim 1 wherein said first predetermined number of said first set of samples is equal to said second predetermined number of said second set of samples.

3. An apparatus for use in a self tuning controller to obtain the first order approximation characteristics of a field process system controlled by said controller, said first order approximation having a time constant and an overall deadtime, said field process system having a process variable and a transport delay, said apparatus comprising:
  i. means for applying a predetermined step input to said field process system;
  ii. means for determining the slope of the response of said process variable to said step input, said slope determining means comprising:
    a. means for measuring first and second sets of samples of said process variable response, said second set delayed from said first set, said first set having a first predetermined number of said samples and said second set having a second predetermined number of said samples;
    b. means for calculating the moving averages of said first and second sets of samples and the difference between said moving averages of said first and second sets; and
    c. means for dividing said difference by a predetermined divisor to find said slope;
  iii. means for determining when said slope is a maximum and defining a predetermined point within the range of points defined by said first and second predetermined number of samples associated with said maximum slope and measuring the time of occurrence of said predetermined point and the amplitude of said process variable step input response associated with said predetermined point;
  iv. means for determining when said process variable step input response is in a steady state condition and the amplitude of said process variable when said process variable step input response is in said steady state condition;
  v. means for calculating said first order approximation overall deadtime from said maximum slope, said time of occurrence and said associated process variable step input response amplitude;
  vi. means for determining from said overall deadtime and said transport delay the apparent delay of said process variable input step response; and
  vii. means for determining said first order approximation time constant from said maximum slope, said time of occurrence, said process variable step input response amplitude associated with said predetermined point, said process variable amplitude when said process variable step input response is in said steady state condition and said apparent delay.

4. The apparatus of claim 3 wherein said first predetermined number of said first set of samples is equal to said second predetermined number of said second set of samples.

5. A method for use in a self tuning controller to obtain the first order approximation characteristics of a field process system controlled by said controller, said first order approximation having a time constant and an overall deadtime, said field process system having a process variable, said method comprising the steps of:
  i. determining if said process variable is in an initial steady state condition and the amplitude of said process variable in said initial steady state condition;
  ii. determining once said process variable is in said initial steady state condition a predetermined value for the amplitude of the process variable response to a predetermined step input applied to said field process system and a predetermined value for the slope of said process variable step input response and applying said step input to said field process system;
  iii. determining when said process variable step input response amplitude and slope are not less than said predetermined amplitude value and said predetermined slope value and calculating from said process variable step input response not less than amplitude and not less than slope and the time of occurrence of said not less than amplitude the response detect time of said process variable step input response;

iv. determining the slope of the response of said process variable to said step input comprising the steps of:
  a. measuring first and second sets of samples of said process variable response, said second set delayed from said first set, said first set having a first predetermined number of said samples and said second set having a second predetermined number of said samples;
  b. calculating the moving averages of said first and second sets of samples and the difference between said moving averages of said first and second sets; and
  c. dividing said difference by a predetermined divisor to find said slope;

v. determining when said slope is maximum and defining a predetermined point within the range of points defined by said first and second predetermined number of samples associated with said maximum slope and measuring the time of occurrence of said predetermined point and said process variable amplitude associated therewith;

vi. determining when said process variable step input response is in a steady state condition and the amplitude of said process variable when said process variable step input response is in said steady state condition;

vii. calculating said first order approximation overall deadtime from said maximum slope, said maximum slope time of occurrence and said associated process variable amplitude when said process variable step input response is in said steady state condition; and viii. determining from said overall deadtime and said response detect time the apparent delay of said process variable step input response;

ix. determining said first order approximation time constant from said maximum slope, said maximum slope time of occurrence, said associated process variable amplitude, said process variable initial steady state condition amplitude, said process variable amplitude when said process variable step input response is in said steady state condition and said apparent delay.

6. A method for use in a self tuning controller to obtain the first order approximation characteristics of a field process system controlled by said controller, said first order approximation having a time constant and an overall dead time, said field process system having a process variable, said method comprising the steps of:
  i. applying a step input having a predetermined amplitude to said field process system;
  ii. determining the slope of the response of said process variable to said step input comprising the steps of:
    a. measuring first and second sets of samples of said process variable response, said second set delayed from said first set, said first set having a first predetermined number of said samples and said second set having a second predetermined number of said samples;
    b. calculating the moving averages of said first and second set of samples and the difference between said moving averages of said first and second sets; and
    c. dividing said difference by a predetermined divisor to find said slope;
  iii. determining when said slope is a maximum and defining a predetermined point within the range of points defined by said first and second predetermined number of samples associated with said maximum slope and measuring the time of occurrence of said predetermined point and the amplitude of said process variable step input response associated with said predetermined point;
  iv. calculating said first order approximation overall deadtime from said maximum slope, said time of occurrence and said associated process variable step input response amplitude;
  v. determining from the ratio of said associated process variable step input response amplitude to said step input predetermined amplitude a gain for said field process system;
  vi. determining from a response detect time for said field process system and said first order approximation overall deadtime the apparent delay of said process variable step input response; and vii. determining said first order approximation time constant from said maximum slope, said time of occurrence, said associated process variable step input response amplitude, said process gain, and said apparent delay.

7. The method of claim 6 wherein said first predetermined number of said first set of samples is equal to said second predetermined number of said second set of samples.

8. An apparatus for use in a self tuning controller to obtain the first order approximation characteristics of a field process system controlled by said controller, said first order approximation having a time constant and an overall dead time, said field process system having a process variable, said apparatus comprising:
  i. means for applying a step input having a predetermined amplitude to said field process system;
  ii. means for determining the slope of the response of said process variable to said step input comprising the steps of:
    a. means for measuring first and second sets of samples of said process variable response, said second set delayed from said first set, said first set having a first predetermined number of said samples and said second set having a second predetermined number of said samples;
    b. means for calculating the moving averages of said first and second set of samples and the difference between said moving averages of said first and second sets; and
    c. means for dividing said difference by a predetermined divisor to find said slope;
  iii. means for determining when said slope is a maximum and defining a predetermined point within the range of points defined by said first and second predetermined number of samples associated with said maximum slope and measuring the time of occurrence of said predetermined point and the amplitude of said process variable step input response associated with said predetermined point;
  iv. means for calculating said first order approximation overall deadtime from said maximum slope, said time of occurrence and said associated process variable step input response amplitude;
  v. means for determining from the ratio of said associated process variable step input response amplitude to said step input predetermined amplitude a gain for said field process system;

vi. means for determining from a response detect time for said field process system and said first order approximation overall deadtime the apparent delay of said process variable step input response; and vii. means for determining said first order approximation time constant from said maximum slope, said time of occurrence, said associated process variable step input response amplitude, said process gain, and said apparent delay.

9. The apparatus of claim 8 wherein said first predetermined number of said first of sample is equal to said second predetermined number of said second set of samples.

* * * * *